United States Patent [19]

Violette et al.

[11] Patent Number: 5,118,256
[45] Date of Patent: Jun. 2, 1992

[54] BLADE RETENTION APPARATUS WITH ELASTOMERIC PRELOAD

[75] Inventors: John A. Violette, Granby; Peter D. Ventura, Enfield, both of Conn.

[73] Assignee: United Technologies Corporation, Hartford, Conn.

[21] Appl. No.: 693,176

[22] Filed: Apr. 29, 1991

[51] Int. Cl.⁵ .................................... B64C 11/06
[52] U.S. Cl. .......................... 416/134 R; 416/205; 416/239
[58] Field of Search .......... 416/134 R, 204 R, 205, 416/239, 500; 384/581, 582

[56] References Cited

U.S. PATENT DOCUMENTS

| | | | |
|---|---|---|---|
| 2,313,301 | 2/1940 | Ratie et al. | 416/205 |
| 2,652,123 | 9/1953 | Kearns, Jr. | 170/160.58 |
| 2,704,129 | 3/1955 | Cushman | 416/205 |
| 3,029,876 | 4/1962 | Scott | 170/160.58 |
| 3,040,817 | 6/1962 | Elmes et al. | 170/160.58 |
| 3,560,110 | 1/1969 | Cornell | 416/205 |
| 3,589,835 | 7/1969 | Linden | |
| 3,764,230 | 10/1973 | Rybicki et al. | |
| 3,862,812 | 1/1975 | Gorndt et al. | |
| 4,108,508 | 8/1978 | Clinard, Jr. | |
| 4,141,664 | 2/1979 | Moran et al. | 416/134 A |
| 4,257,739 | 3/1981 | Covington et al. | |
| 4,297,078 | 10/1981 | Martin | |
| 4,365,936 | 12/1982 | Hatch | |
| 4,850,801 | 7/1989 | Valentine | 416/205 |
| 4,859,148 | 8/1989 | Hibyan | |
| 4,877,375 | 10/1989 | Desjardins | |
| 4,921,403 | 4/1992 | Poucher et al. | |

Primary Examiner—Edward K. Look
Assistant Examiner—Michael S. Lee
Attorney, Agent, or Firm—William W. Habelt

[57] ABSTRACT

Preloading and retention of a variable-pitch, lightweight propeller blade (10) are achieved through a retention assembly wherein the blade shank (20) is retained within a hub arm (24) with an inboard angular contact pitch change bearing (30) and an outboard angular contact anti-rocking bearing (50) which is elastomerically preloaded. The outboard bearing (50) is disposed intermediate a bearing race (34) on the shank (20) and an annular frusto-conical rigid support member (62) which is biased outboardly against the anti-rocking bearing (50) by an annular frusto-conical body (72) of elastomeric material selected to impart a desired stiffness and/or damping effect to the retention assembly.

10 Claims, 2 Drawing Sheets

BLADE RETENTION APPARATUS WITH ELASTOMERIC PRELOAD

TECHNICAL FIELD

This invention relates in general to variable-pitch propulsors and, more particularly, to apparatus for mounting a light-weight propulsor blade to a hub through use of a preloaded retention bearing which provides for rotation of the blade in order to effectuate a pitch change.

BACKGROUND ART

It has been the common practice to mount variable pitch propulsor blades, such as propeller blades or fan blades of aircraft engines, to a central rotating hub by retaining each blade root in its own retention socket, a plurality of which are circumferentially spaced about and extend radially outwardly from the central hub. Customarily, each blade root is retained within its retention socket for rotation therein about a pitch change axis by means of an inboard angular contact ball bearing assembly and a circumferential outboard bearing assembly, each operatively disposed intermediate the blade root and the inner wall of the retention socket. For example, in the retention system described in commonly assigned U.S. Pat. No. 3,490,537, both the inboard angular contact bearing and the outboard circumferential bearing are ball bearings, and both are disposed and supported in part in a bearing race formed in the shank of the blade root and in part in a cooperating bearing race formed in the inner wall of the retention hub. In U.S. Pat. No. 4,921,403, however, the outboard circumferential bearing is a roller bearing rather than a ball bearing, and both the inboard angular contact ball bearing and the outboard circumferential roller bearing are disposed and supported in separate bearing races which are seated in the blade root and the inner wall of the retention socket rather than being integrally formed therein.

In these type retention systems, the outboard circumferential bearing, whether a ball bearing or roller bearing, is not preloaded and serves simply to limit bending motion. Such retention bearings have proven quite satisfactory for use with heavier prior art propulsor blades, for example steel or aluminum propeller blades and titanium fan blades, since these blades weigh enough that they experience sufficient centrifugal loading when rotating at operating RPM that rocking of the retention bearings does not occur. However, modern lightweight hollow shell and spar construction blades, such as blades wherein the blade shell and/or blade spar are made of lightweight composite materials, may not experience sufficient centrifugal loading to prevent the bearing elements on one side of the bearing from becoming unloaded under the influence of bending loads imposed upon the blade during operation. As a result, high blade cyclic bending loads during climb can lead to fretting wear and/or excessive contact stresses.

One method of preventing rocking is to simply increase the pitch diameter of the bearing. However, doing so increases the weight of the blade retention system thereby offsetting much of the desired weight reduction achieved by using lightweight composite blades. Further, increasing the pitch diameter of the bearing leads to increased blade root thickness, thus resulting in poorer aerodynamic performance and higher secondary stresses in the hollow composite blade root structure.

Another method is to augment the centrifugal loading experienced during operation by preloading the bearings to adequately counter the bending loads so as to prevent such undesirable blade rocking. For example, in U.S. Pat. No. 3,040,817, the inboard and outboard bearings are preloaded by a threaded member which is screwed into an internally threaded cavity in the blade root so as to pull the blade inboardly such that the bearings are maintained in contact with their respective races between the blade root and the encompassing retention socket. While functional, such a retention arrangement includes a threaded interface in the primary load transfer path from the blade root to the hub and, therefore, provides a discontinuity at which stress may undesirably concentrate when the blade undergoes high centrifugal loading during operation.

The retention system disclosed in commonly assigned U.S. Pat. No. 4,850,801, also utilizes a threaded member as a means of preloading the outboard anti-rocking bearing, but moves the discontinuity provided by the threaded interface to a location outside the primary load transfer path. As disclosed therein, the outboard anti-rocking bearing comprises an angular contact ball bearing which is preloaded by an annular fastener threaded into the socket so as to pull the blade outboardly thereby preloading this angular contact bearing between a bearing race on the blade root and a bearing race on the annular fastener. The annular preloading fastener also serves to support a relatively small diameter O-ring static seal and a relatively large diameter O-ring dynamic seal. Although all discontinuities due to the interengagement of the threaded preloading fastener are advantageously moved out of the primary load path to a radially outer location on the hub arm where the stresses are lower, the discontinuities at the threaded interface still exist.

DISCLOSURE OF INVENTION

It is an object of the present invention to provide an improved variable pitch propulsor blade retention apparatus particularly suited for the retention of lightweight propulsor blades.

It is also an object of the present invention to provide such a retention apparatus wherein a preloaded anti-rocking bearing disposed outboardly of the pitch change bearing is preloaded by an elastomeric preloading means thereby eliminating any threaded discontinuities in the load transfer path from the blade root to the hub.

It is a further object of the present invention to provide such an elastomerically preloaded blade retention system which is easily assembled and disassembled for blade removal and replacement.

Accordingly, in the blade retention assembly of the present invention, the inboard portion of the blade root serves as a blade retention member which extends axially into a retention socket extending radially outwardly from the propulsor hub, and is retained within the retention socket defined by the hub arm so as to be rotatable about the blade axis by means of an inboard angular contact pitch change bearing and an outboard angular contact anti-rocking bearing which is preloaded by an elastomeric preloading means.

The retention socket has a radially inboard generally cylindrical body portion having a primary bearing race, a radially outboard larger diameter lip portion, and a circumferentially outwardly diverging wall portion extending therebetween which provides a surface for supporting the elastomeric preloading means. The blade retention member has an inboard primary bearing race and a secondary bearing race disposed axially outboard of the primary bearing race. When the retention member is installed and preloaded within the retention socket, the inboard pitch change bearing is operatively disposed intermediate the primary bearing race of the blade retention member and the primary race of the retention socket, and the outboard pitch change bearing is operatively disposed about the secondary bearing race of the blade retention member and the elastomeric preloading means which is supported upon the diverging wall portion of the retention socket.

The elastomeric preloading means advantageously comprises an elastomeric member and an annular frusto-conical rigid support member having an interiorly facing surface which provides a bearing race that the outboard anti-rocking bearing bears against and an exteriorly facing surface on which the elastomeric member is mounted. The elastomeric member comprises an annular body of relatively soft, elastic material, such as natural rubber, synthetic rubber or other conventional elastomeric materials, which is disposed with its exteriorly facing surface disposed against the conical wall portion of the hub arm and with its interiorly facing surface against, and preferably bonded to, the exteriorly facing surface of the support member. It is desirable that the elastomeric material be oil-resistant per se, or be coated with a protective layer of oil-resistant elastomeric material. Additionally, one or more relatively thin, metal interleaf layers, advantageously conical in shape, may be disposed within the elastomeric material forming the frusto-conical body of the elastomeric member to alter the stiffness or stress mitigating properties of the elastomeric body.

BRIEF DESCRIPTION OF DRAWING

These and other objects, features and advantages of the present invention will become more apparent in light of the detailed description of a best mode embodiment thereof, as illustrated in the accompanying drawing, wherein.

BEST MODE FOR CARRYING OUT THE INVENTION

Figure 1:
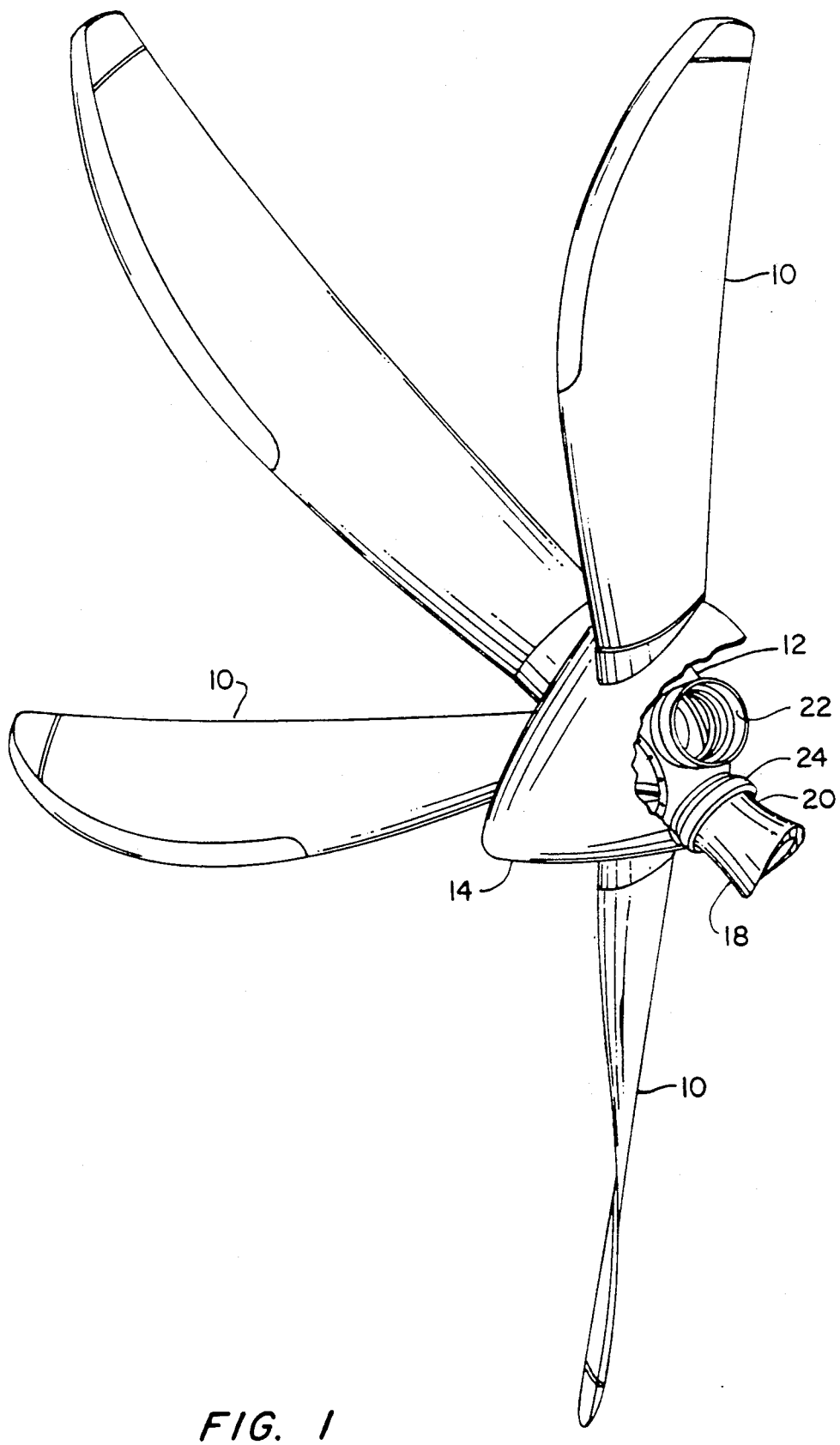
FIG. 1 is a perspective view, partly in section, of a propeller assembly having six blades each of which is rotatably mounted for pitch change within a hub arm.

Referring now to the drawing, there is depicted therein a variable pitch aircraft propeller assembly of the type to which the retention apparatus of the present invention may be readily applied. It is to be understood, however, that the retention apparatus of the present invention may also be readily utilized for mounting variable pitch propulsor blades of any type wherein it is desired to rotatably mount the root of the blade root within a retention socket defined by an encompassing hub arm, such as, for example, turboprop blades, ducted and unducted turbofan blades, and propfan blades.

In the aircraft propeller assembly depicted in FIG. 1, a plurality of light-weight propeller blades 10 are mounted to a rotatable propeller hub 12 for rotation therewith when the hub 12 is driven by an operatively associated drive shaft (not shown) driven by the aircraft engine (not shown) for purposes of developing thrust to power the aircraft. The propeller hub is covered by an aerodynamic spinner 14 (partly sectioned) which provides a low drag surface and defines an inner chamber housing a pitch change mechanism (not shown) which is operatively connected to each of the propeller blades 10 to permit the pilot or an automatic controller to effectuate inflight blade pitch changes. To facilitate pitch change, the root portion of each propeller blade 10, which comprises a blade retention member 18, is mounted with its shank 20 rotatably disposed within a retention socket 22 defined within one of the hub arms 24 which extend radially outward at circumferentially spaced intervals about propeller hub 12.

Figure 2:
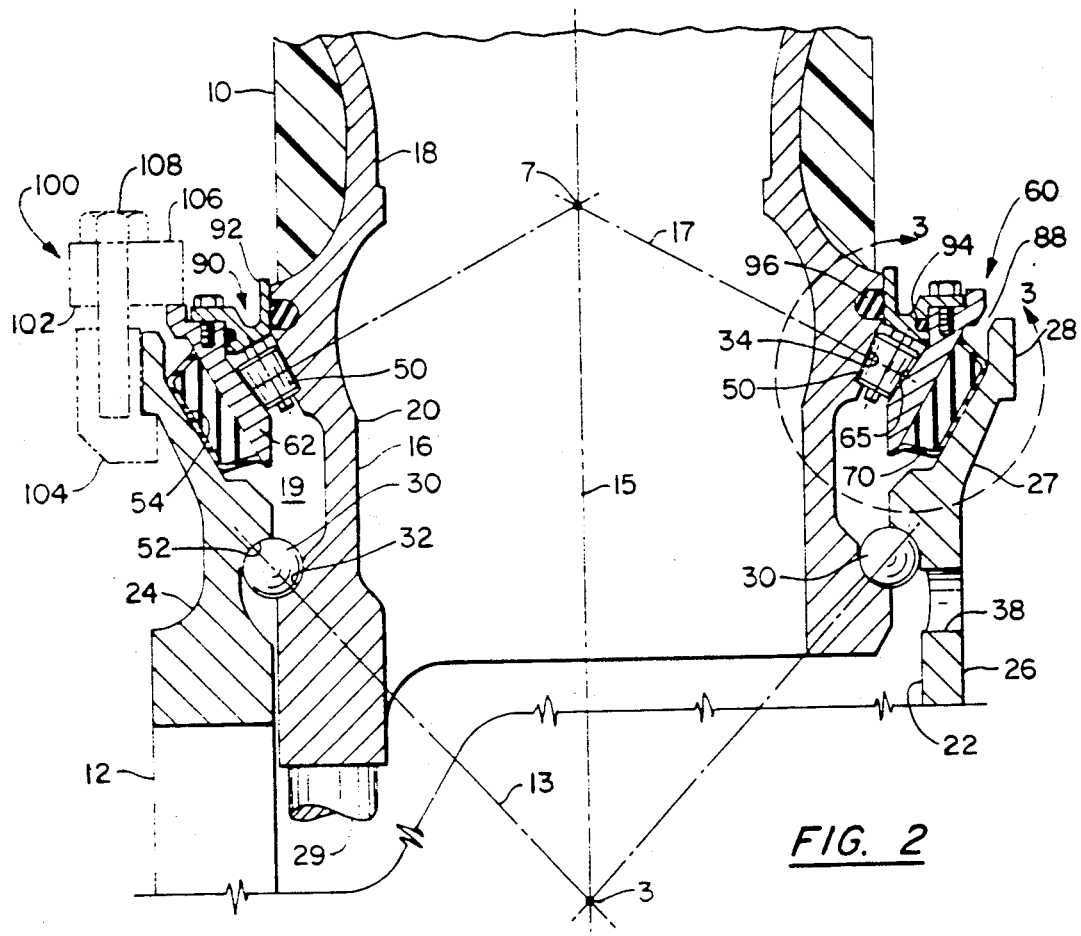
FIG. 2 is sectional side elevational view of an individual propulsor blade of the propeller assembly of FIG. 1 mounted in a retention socket of the hub arm by means of the blade retention apparatus of the present invention.

Referring now to FIG. 2, an eccentric roller pin 29, adapted for mounting a pitch change roller (not shown), extends from the lower end of the root portion 18 of each blade 10 inwardly into the hub 12 and, as in conventional practice, is operatively connected via the pitch change roller mounted thereto to the pitch change mechanism (not shown) such that, upon activation of the pitch change mechanism, each blade 10 rotates within its retention socket 22 about an axis 15 extending radially outward through the center of its associated hub arm coincident with the spanwise axis of the blade 10 in a conventional manner. Although the hub 12 is most advantageously a one-piece cylindrical disc-like member, the hub 12 may also be a two-piece structure of the type wherein a front and back half are bolted, or otherwise secured together, to form a generally cylindrical disc-like member having a plurality of radially outwardly extending, circumferentially spaced hub arms, typically from two to eight or more in number, each defining a blade retention socket.

The shank 20 of the blade retention member 18 of the root portion of blade 10 is received within a retention socket 22 defined within a hub arm 24, each blade of the multi-bladed propeller assembly being received within its own socket 22 of an individual hub arm, the number of arms 24 on the hub 12 being equal to the number of blades 10 of the multi-bladed propeller assembly. Each of the hub arms 24 comprises a generally cylindrical radially inboard body 26 extending radially outwardly from the disc-like hub 12, a generally cylindrical radially outboard lip portion 28, whose diameter is greater than the diameter of the inboard body portion 26 of the hub arm 24, and a generally frusto-conical circumferential wall portion 27 extending outwardly in a diverging manner between the inboard body portion 26 and the greater diameter lip portion 28 of the hub arm 24. The shank 20 of the blade retention member 18 advantageously has a neck down portion 16 formed therein which provides a circumferential recess 19 about the blade shank 20 which serves to facilitate both insertion of the inboard pitch change bearing 30 during blade installation and removal thereof when necessary.

To rotatably support the blade 10 within the retention socket 22, a primary pitch change bearing 30 is operatively disposed in angular contact relationship between the radially inboard portion of the shank 20 of the blade retention member 18 and the inboard portion of the hub arm 24. In addition to the primary pitch change bearing 30, a second preloaded anti-rocking bearing 50 is operatively disposed in angular contact relationship between the shank 20 of the blade retention member 18 and the inboard portion of the hub arm 24 at a location radially outboard of the inboard pitch change bearing 30. The outboard bearing 50 provides an outwardly directed preloading force on the lightweight blade 10 and serves to react bending moments imposed on the blades during operation so as to prevent and reduce contact stress, while the inboard pitch change bearing reacts the preload force and centrifugal load acting upon the blade 10 and ensures that the shank 20 of the blade 10 may readily rotate within the hub arm 24 to effectuate a blade pitch change.

To accommodate the inboard bearing 30, cooperating primary bearing races 32, 52 are provided, respectively, on the outer surface of the blade retention member 18 and on the inner surface of the inboard body portion 26 of hub arm 24. Most advantageously, a locally hardened primary bearing race 32 is integrally machined about the circumference of the inboard end of the shank 20 in the outer surface of the blade retention member 18 and a locally hardened primary bearing race 52 is similarly integrally machined in the inner surface of the inboard body portion 26 of the hub arm 24. However, separate primary bearing races, mounted in cooperative arrangement to the outer surface of the inboard end of the shank 20 and the inner surface of the inboard body portion 26 of the hub arm 24, could also be used. Most advantageously, the inboard bearing means 30 comprises ball bearing means of the conventional type, such as a plurality of steel balls captured in snap-in pockets of a flexible bearing support string, although other bearing types, such as for example, a roller bearing, may be utilized. Irrespective of the type of bearing employed, the inboard bearing means 30 is operatively disposed in part in the primary bearing race 32 of the blade retention member 18 and in part in the outboard region of the primary bearing race 52 of the hub arm 24 in such a manner that angular contact is provided across the bearing between the blade retention member and the hub arm. Through such an angular contact arrangement, a cone of contact 13 having an inboard focal point 3 and extending generally outboardly at an acute angle to the horizontal, advantageously of about 45 to 65 degrees, is established along which are reacted the blade centrifugal load, the preload, and a portion of blade shear forces, i.e. thrust and torque, along with a portion of the bending load.

The primary bearing race 52 is somewhat enlarged inwardly of the ball contact area so that the blade 10 may translate axially inboardly within the hub arm 24 when the blade 10 is unloaded when not in operation for removal or servicing. For instance, when the preloading forces on the blade 10 are relaxed and the secondary bearing hardware is temporarily slid up the blade shank, the pitch change bearing means 30 may be moved axially inboardly within the hub arm 24 so as to facilitate replacement of the bearing balls through the blade shank hollow 19 or a ball access hole 38, as in conventional practice.

Figure 3:
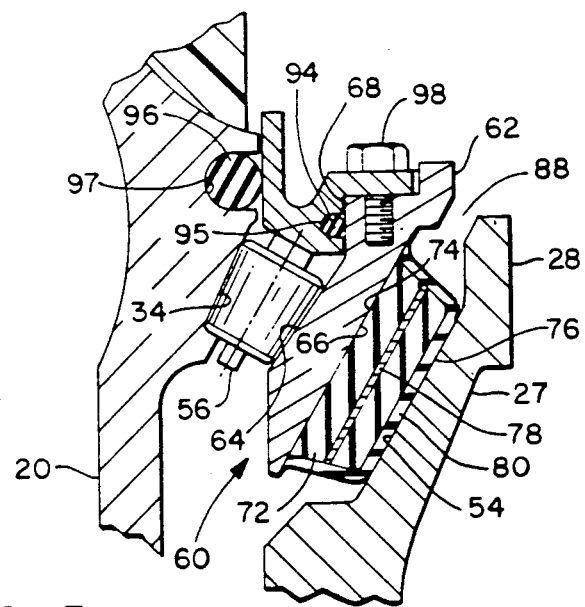
FIG. 3 is an enlarged side elevational view of the region of FIG. 2 encompassed by the dashed line.

A secondary bearing race 34 is provided about the circumference of the shank 20 in the outer surface of the blade retention member 18 at a location radially outboard of the primary bearing race 32 and of the neck down portion 16 in the shank 20 of the blade retention member 18. Like the primary bearing race 32, the secondary bearing race 34 is preferably locally hardened and then integrally machined in the outer surface of the shank 20, although the secondary bearing race may comprise a distinct member mounted about the circumference of the shank 20. As best seen in FIGS. 2 and 3, the secondary bearing race 34 is disposed circumferentially about the shank 20 outboard of the primary bearing race 32 and angled inboardly so as to cooperatively face in spaced relationship the inner surface 54 of the generally conical outwardly diverging wall portion 27 of the hub arm 24. The outboard anti-rocking bearing means 50 and the adjustable elastic preloading means 60 are operatively disposed in the annular gap provided between the secondary bearing race 34 on the shank 20 of the blade retention member 18 and the inner surface 54 of the wall portion 27 of the hub arm 24.

The outboard anti-rocking bearing 50 most advantageously comprises a roller bearing having a flexible string of conical tapered roller elements 56 disposed in a ring about and against the secondary bearing race 34 on the outer surface of the shank 20 of the blade retention member 18, although other bearing types, such as for example, a ball bearing, could also be used for the outboard anti-rocking bearing 50. The adjustable elastomeric preloading means 60 is operatively disposed between the outboard anti-rocking bearing 50 and the angled inwardly facing surface 54 of the conical wall portion 27 of the hub arm 24. The preloading means 60 comprises a rigid support member 62 and an elastomeric member 70 which is precompressed during installation so that when the blade 10 is installed, the elastomeric member will exert a preloading force upon the outboard anti-rocking bearing 50. The support member 62 comprises an annular frusto-conical body of rigid material, for example steel, having an interiorly facing surface 64 which is disposed at an acute angle to the blade axis and in opposed facing relationship with the secondary bearing race 34 of the shank 20 and provides a bearing race 65 which bears against the outboard anti-rocking bearing 50. The frusto-conical support member 62 has an exteriorly facing surface 66 on the opposite side thereof on which the elastomeric member 70 is disposed. As the outboard anti-rocking bearing 50 is positioned between the bearing race 65 lying on the angled interiorly facing surface 64 and the inboardly angled secondary bearing race 34, angular contact is provided across the anti-rocking bearing 50 between the blade retention member 18 and the hub arm 24 thereby establishing a cone of contact 17 having an outboard focal point 7 along which the remaining portion of the bending load and the shear forces are reacted.

The elastomeric member 70 comprises an annular body 72 of relatively soft, elastic material, such as natural rubber, synthetic rubber or other conventional elastomeric materials, which is disposed with its interiorly facing surface 74 against, and preferably bonded to, the exteriorly facing surface of the support member 62, and with its exteriorly facing surface 76 disposed against the conical wall portion 27 of the hub arm 24. As the elastomeric member 70 will be exposed to oil in the environment of its intended use in the retention apparatus of the present invention, it is desirable that the elastomeric material forming the elastomeric member, whether natural or synthetic material, be oil-resistant per se, or be coated with a protective layer of oil-resistant elastomeric material, so that exposure to oil over time will not cause deterioration of the elastomeric member 70. In the exemplary embodiment described herein, the elastomeric member 70 comprises a continuous annular frusto-conical body 72 of natural rubber material vulcanized at its interiorly facing surface 74 to the exteriorly facing surface of the support member 62 and coated on all other surfaces with a protective encasement 80 of an oil-resistant material, for example oil-resistant synthetic rubber.

The stiffness of the elastomeric body 72 is preselected to provide the desired blade preloading and also to impart a desired stiffness to the overall blade retention system such that resonant blade frequencies are avoided in the desired operational rotational speed bands. The preloading and stiffness of the retention system may be changed by simply replacing the elastomeric body 72 with an elastomeric body 72 having a different elastomer stiffness which is selected to impart a desired overall stiffness to the retention system. The stiffness of the elastomeric body 72 is directly related to the particular elastomeric material out of which it is made, each elastomeric material having a durometer grade characteristic of its particular elastomer stiffness. Additionally, one or more relatively thin, metal interleaf layers 78, advantageously conical in shape, may be disposed within the elastomeric material forming the frusto-conical body 72 of the elastomeric member 70 to alter the stiffness or stress mitigating properties of the elastomeric body 72.

A sealing assembly 90 is operatively disposed between the shank 20 of the blade retention member 18 and the support member 62 of the preloading means 60 at a location outboard of, and advantageously adjacent to, the outboard bearing 50. The sealing assembly 90 serves to provide both a static seal and a dynamic seal between the outboard bearing 50 and the exterior environment. The sealing assembly 90 advantageously comprises an annular retainer ring 92 disposed about the shank 20 of the blade retention member 18, a relatively small O-ring seal 94 operatively disposed at the interface between an outward circumferential surface of the retainer ring 92 and an inward circumferential surface 68 provided on the outboard end of the rigid support member 62 of the elastomeric preloading means 60, a relatively larger O-ring seal 96 operatively disposed at the interface between an inward circumferential surface of the retainer ring 92 and the shank 20 of the blade retention member 18, and removable fasteners 98 for mounting the retainer ring 92 to the annular rigid support member 62.

The smaller O-ring seal 94, which preferably is housed in a suitable circumferential groove 95 machined in the outward surface of the annular retainer ring 92 so as to bear in sealing relationship against the inward circumferential surface 68 provided on the outboard end of the rigid support member 62 of the elastomeric preloading means 60, provides the static seal, while the larger O-ring seal 96, which is preferably housed in a suitable groove 97 machined in the outer surface of the shank 20 of the blade retention member 18 so as to bear in sealing relationship against the inward circumferential surface of the retainer ring 92, provides the dynamic seal. Use of the larger O-ring seal 96 as a dynamic seal is acceptable with the retention apparatus of the present invention since relative motion at the mating surfaces is small because the elastomeric body 72 of the elastomeric member 70 is the softest element in the bearing system, and since the interfacing surfaces of the annular support member 62 of the elastomeric member 70, the annular retainer ring 92 and the blade shank 20 remain in close alignment.

An annular safety gap 88 is intentionally provided between the outboard most extremity of the rigid support member 62 of the preloading means 60 and the inboard end of the annular lip portion 28 of the hub arm 24 to provide a safety margin for movement of the blade 10 in the event of severe blade moments before the rigid support member 62 contacts the lip portion 28 of the hub arm 24. Such severe blade bending moments may be experienced if the light-weight blade 10 repeatedly contacts a dense object such as the ground, deep snow or water. The lip portion 28 of the hub arm 24 provides a hard stop to limit movement of the blade under such bending moments beyond that permissible movement provided for by the safety gap 88. By limiting the movement of the blade 10, loss of the bearing elements is prevented and the blade is forced to absorb more of the impact energy, which in the case of a light-weight blade constructed of composite fibers would be gradually absorbed through abrading away and partial fragmenting of the blade, rather than the far more dangerous event of total blade release due to catastrophic failure at the blade retention.

To install and retain a light-weight propulsor blade 10 within a retention socket 22 under the desired preload, the O-ring seals 94 and 96 are first installed in their respective housing grooves. The annular seal retainer ring 92 and the annular elastomeric preloading means 60 are then slid, in this order, up the shank 20 of the blade retention member 18 and temporary secured Next, the root portion of the blade 10 is inserted into the retention socket 22 defined by the hub arm 24 up to a point inboard of its final installed and preloaded position such that the circumferential recess 19 formed about the neck down portion of the shank 18 lies proximate the inboard bearing race 52. With the blade 10 so positioned, there is now adequate room for the ball bearing string, with the balls already in their snap-in pockets, to be slid into position to provide the inboard pitch change bearing 30 or to be installed through the ball access hole 38. Next, the blade 10 is pulled back out to seat the balls of the inboard bearing 30 in the cooperating inboard bearing races 32 and 52, and the elastomeric preloading means 60 is slid off the blade shank 18 until the elastomeric body 72 contacts the conical wall portion 27 of the hub arm 24.

At this point in the installation, a temporary assembly clamp 100 (shown for illustration purposes by dash lines on the left side only) having an outboard half 102 and an inboard half 104, both of which are split circumferentially, is assembled about the blade 10 to maintain the elastomeric preloading means 70 in a desired compressed state against the conical wall portion 27 of hub arm 24. To assemble the clamp, the inboard clamp sections 104 are brought into position and secured together to lock about the lip portion 28 of hub arm 24. The outboard sections 102 of the clamp are then positioned about the blade shank 18 with an inner annular lip portion 106 thereof abutting the annular rigid support member 62 of the preloading means 60, secured together, and connected to the inboard half 104 of the clamp by a plurality of adjustable fasteners, such as threaded bolts 108. The outboard clamp half 102 is then pulled axially inboardly toward the inboard clamp half 104 until a preset stop position is reached by tightening the fastener bolts 108, thereby drawing the annular rigid support member 62 axially inboardly toward the conical wall portion 27 of the hub arm 24 whereby the elastomeric body 72 of the elastomeric member 70 is compressed and preloaded as desired.

With the elastomeric member 70 so compressed by the temporary clamping means 100, the flexible string of tapered roller bearings 56 is disposed in its operative position between the bearing race 65 provided on the frusto-conical interiorly facing surface 64 of the rigid support member 62 and the secondary bearing race 34 on the outer surface of the shank 20 of the blade retention member 18 to provide the outward anti-rocking bearing 50. Finally, the seal retainer ring 92 is slipped down the shank 20 of the blade 10 and secured in position by means of the fastening means 98, for example threaded bolts, to the annular support member 62 to provide restraint to the bearing elements 50 against movement to establish a protective seal between the bearings 30 and 50 inboard thereof and the exterior environment.

Installation of the blade 10 into its retention socket 22 is now completed and the temporary clamp 100 is removed. Upon removal of the temporary clamp, the precompressed elastomeric body 72 relaxes thereby maintaining a desired preloading force on the outboard anti-rock bearing 50 such that the primary bearing race 32 at the inboard end of the shank 18 of the light-weight blade 10 is biased outwardly thus maintaining the inboard pitch change bearing in position against the primary bearing race 52 on the hub arm 24.

The blade retention system of the present invention has the unique advantage of being tunable such that undesirable resonant blade frequencies are avoided in the desired operational rotational speed bands. By selecting for the elastomeric body 72 an elastomeric material having a durometer grade characteristic of a particular stiffness, the preloading and bending stiffness of the retention may be selectively varied to properly tune the retention system to avoid resonant blade frequencies within the desired operational rotational speed bands. Further, the retention system of the present invention provides a damping effect which conventional blade retention systems without elastomeric support can not, thereby preventing vibration in the event that a resonant frequency does occur within the operational rotational speed bands or in the event that propeller instability vibrations are experienced such as may be produced during blade flutter.

Although the invention has been shown and described with respect to an exemplary embodiment thereof, it should be understood by those skilled in the art that the foregoing and various other changes, omissions, and additions in the form and detail thereof may be made therein without departing from the spirit and scope of the invention.

We claim:
1. A blade retention assembly for mounting a variable-pitch propulsor blade in a propulsor hub, said blade retention assembly comprising:
   a) a blade retention member extending axially from said blade;
   b) hub arm means extending radially outwardly from the propulsor hub and defining a retention socket for receiving therein said blade retention member;
   c) inboard pitch change bearing means operatively disposed in said retention socket intermediate said blade retention member and said hub arm means;
   d) outboard anti-rocking bearing means operatively disposed about said blade retention member at a location outboard of said inboard pitch change bearing means; and
   e) elastomeric preloading means operatively disposed intermediate said outboard anti-working bearing means and said hub arm means for selectively preloading said outboard anti-rocking bearing means outboardly whereby said inboard pitch change bearing means is thereby preloaded against said hub arm means, said elastomeric preloading means being preselected to provide a desired damping effect and to impart a desired stiffness to said retention assembly.

2. A blade retention assembly as recited in claim 1 wherein said adjustable elastomeric preloading means comprises:
   a) an annular frusto-conical rigid support member having an interiorly facing surface disposed in contact with said outboard anti-rocking bearing means disposed about said blade retention member and an exteriorly facing surface; and
   b) an annular frusto-conical body of elastomeric material having an interiorly facing surface abutting the exteriorly facing surface of said rigid support member and an exteriorly facing surface abutting said hub arm means, said elastomeric material having a durometer value selected to impart a desired retention stiffness to the blade retention assembly.

3. A blade retention assembly as recited in claim 2 wherein said hub arm means comprises a radially inboard generally cylindrical body portion, a radially outboard generally cylindrical lip portion, and a circumferentially outwardly diverging wall portion extending therebetween, said inboard body portion having an inner circumferential surface providing a primary bearing race and said diverging wall portion providing a surface abutting the exteriorly facing surface of the elastomeric body of said elastomeric preloading means.

4. A blade retention assembly as recited in claim 3 wherein said blade retention member has a primary bearing race and a secondary bearing race, the secondary bearing race disposed axially outboard of the primary bearing race.

5. A blade retention assembly as recited in claim 4 wherein said inboard pitch change bearing means comprises an angular contact bearing means operatively disposed intermediate the primary bearing race of said blade retention member and the primary bearing race of said hub arm means, and said outboard pitch change bearing means comprises an angular contact bearing means operatively disposed intermediate the secondary bearing race of said blade retention member and the interiorly facing surface of the rigid support member of said elastomeric preloading means.

6. A blade retention assembly as recited in claim 5 wherein said inboard pitch change bearing means comprises an angular contact ball bearing means and said outboard anti-rocking bearing means comprises an angular tapered contact roller bearing means.

7. A blade retention assembly for mounting a variable-pitch propulsor blade in a propulsor hub, said blade retention assembly comprising:
   a) a blade retention member extending axially from said blade, said blade retention member having a primary bearing race and a secondary bearing race, the secondary bearing race disposed axially outboard of the primary bearing race;
   b) hub arm means extending radially outwardly from the propulsor hub and defining a retention socket for receiving therein said blade retention member, said hub arm means having a radially inboard generally cylindrical body portion, a radially outboard generally cylindrical lip portion, and a circumferentially outwardly diverging wall portion extending therebetween, said inboard body portion having an inner circumferential surface providing a primary bearing race and said diverging wall portion providing an angled interiorly facing surface;

c) inboard pitch change bearing means operatively disposed in said retention socket in angular contact relationship intermediate the primary bearing race of said blade retention member and the primary bearing race of said hub arm means;

d) outboard anti-rocking bearing means operatively disposed in the secondary bearing race about said blade retention member at a location outboard of said inboard pitch change bearing means; and e) elastomeric preloading means for selectively preloading said outboard anti-rocking bearing means outboardly whereby said inboard pitch change bearing means is thereby preloaded against said hub arm means, said elastomeric preloading means having an annular frusto-conical rigid support member having an angled interiorly facing surface disposed in opposed facing relationship to the secondary bearing race of said blade retention member with said outboard anti-rocking bearing means operatively disposed therebetween, and an annular frusto-conical body of elastomeric material having an interiorly facing surface abutting an exteriorly facing surface of said rigid support member and an exteriorly facing surface abutting the angled interiorly facing surface of the diverging wall portion of said hub arm means.

8. A blade retention assembly as recited in claim 7 wherein said elastomeric material is selected to impart a desired retention stiffness to said blade retention assembly.

9. A blade retention assembly as recited in claim 7 wherein said elastomeric material is selected to provide a desired damping effect in said blade retention assembly so as to prevent unstable vibrations.

10. A blade retention assembly as recited in claim 7 wherein said inboard pitch change bearing means comprises an angular contact ball bearing means and said outboard anti-rocking bearing means comprises an angular tapered contact roller bearing means.

* * * * *